United States Patent
Bowman et al.

(10) Patent No.: US 9,175,605 B2
(45) Date of Patent: Nov. 3, 2015

(54) GAS TURBINE ENGINE SURGE MARGIN BLEED POWER RECUPERATION

(75) Inventors: Ray F. Bowman, Carmel, IN (US);
Stanford Clemens, Westfield, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 919 days.

(21) Appl. No.: 12/951,274

(22) Filed: Nov. 22, 2010

(65) Prior Publication Data

US 2011/0154830 A1 Jun. 30, 2011

Related U.S. Application Data

(60) Provisional application No. 61/290,619, filed on Dec. 29, 2009.

(51) Int. Cl.
*F02C 6/08* (2006.01)
*F02C 7/32* (2006.01)
*F01D 17/10* (2006.01)

(52) U.S. Cl.
CPC ............... *F02C 6/08* (2013.01); *F01D 17/105* (2013.01); *F02C 7/32* (2013.01); *F05D 2270/101* (2013.01)

(58) Field of Classification Search
CPC ............... F02C 9/18; F02C 6/08; F02C 7/32; F01D 17/105; F05D 2270/101
USPC .............. 60/39.091, 782, 785, 794, 795, 801, 60/773
See application file for complete search history.

(56) References Cited

U.S. PATENT DOCUMENTS

| | | | |
|---|---|---|---|
| 2,612,020 A | 10/1946 | Griffith | |
| 2,677,932 A * | 5/1954 | Forsling | 60/39.15 |
| 3,514,945 A * | 6/1970 | Austin | 60/791 |
| 5,285,626 A | 2/1994 | Leeson | |
| 5,694,765 A * | 12/1997 | Hield et al. | 60/39.163 |
| 5,813,630 A * | 9/1998 | Williams | 244/118.5 |
| 6,316,841 B1 | 11/2001 | Weber | |
| 6,513,333 B2 * | 2/2003 | Sugitani | 60/773 |
| 6,662,575 B2 * | 12/2003 | Clarke | 62/87 |
| 6,837,038 B2 | 1/2005 | Eiler et al. | |
| 7,059,136 B2 | 6/2006 | Coffinberry | |
| 7,605,483 B2 * | 10/2009 | Kern et al. | 290/4 A |
| 2005/0103931 A1 * | 5/2005 | Morris et al. | 244/58 |
| 2005/0210863 A1 | 9/2005 | Wollenweber et al. | |
| 2005/0274117 A1 | 12/2005 | Sheoran et al. | |
| 2006/0010875 A1 | 1/2006 | Mahoney et al. | |
| 2006/0042227 A1 | 3/2006 | Coffinberry | |
| 2006/0042252 A1 | 3/2006 | Derouineau | |
| 2006/0260323 A1 | 11/2006 | Moulebhar | |
| 2007/0137214 A1 | 6/2007 | Zewde et al. | |
| 2007/0266695 A1 * | 11/2007 | Lui et al. | 60/204 |
| 2009/0288421 A1 * | 11/2009 | Zeiner et al. | 60/792 |
| 2010/0082217 A1 * | 4/2010 | Coons | 701/100 |
| 2010/0314877 A1 * | 12/2010 | Finney | 290/52 |

OTHER PUBLICATIONS

International Search Report and Written Opinion, PCT/US2010/062363, Rolls-Royce Corporation, Mar. 29, 2011.

* cited by examiner

*Primary Examiner* — Phutthiwat Wongwian
*Assistant Examiner* — Carlos A Rivera
(74) *Attorney, Agent, or Firm* — Krieg DeVault LLP

(57) ABSTRACT

The present invention provides in one embodiment of the present invention a surge margin power recuperation system. Other embodiments include apparatuses, systems, devices, hardware, methods, and combinations for recuperating power from surge margin bleed air. Further embodiments, forms, features, aspects, benefits, and advantages of the present application shall become apparent from the description and figures provided herewith.

11 Claims, 1 Drawing Sheet

GAS TURBINE ENGINE SURGE MARGIN BLEED POWER RECUPERATION

CROSS REFERENCE TO RELATED APPLICATIONS

The present application claims the benefit of U.S. Provisional Patent Application 61/290,619, filed Dec. 29, 2009, and is incorporated herein by reference.

FIELD OF THE INVENTION

The present invention relates to gas turbine engines, and more particularly, to surge margin bleed power recuperation.

BACKGROUND

Surge margin bleed systems remain an area of interest. Some existing systems have various shortcomings, drawbacks, and disadvantages relative to certain applications. Accordingly, there remains a need for further contributions in this area of technology.

SUMMARY

One embodiment of the present invention is a surge margin power recuperation system. Other embodiments include apparatuses, systems, devices, hardware, methods, and combinations for recuperating power from surge margin bleed air. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
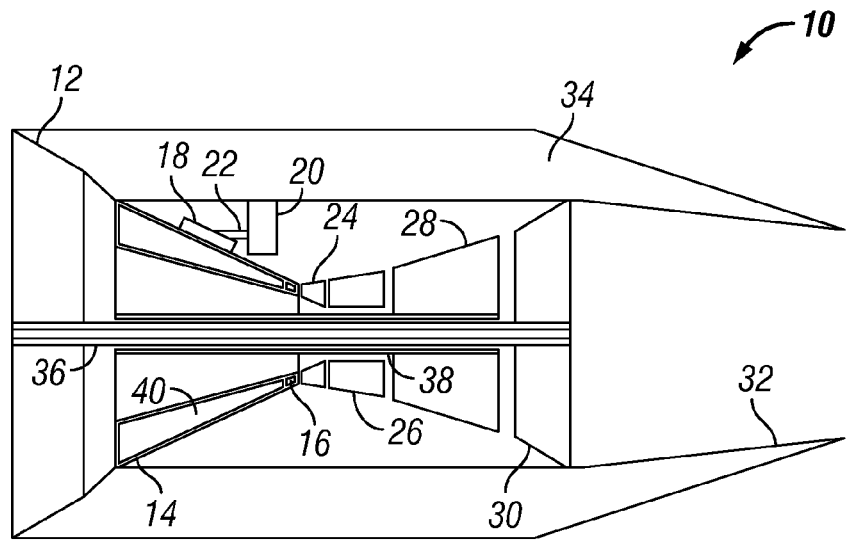
FIG. 1 schematically depicts a gas turbine engine having a surge margin bleed power recuperation system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, a non-limiting example of a gas turbine engine 10 in accordance with an embodiment of the present invention is schematically depicted. Gas turbine engine 10 is an aircraft propulsion power plant in the form of an axial flow turbofan engine. Although the present embodiment is described with respect to an aircraft turbofan configuration, it will be understood that the present invention is equally applicable to other gas turbine engine configurations, for example, including turbojet engines, turboprop engines, and turboshaft engines having axial, centrifugal and/or axi-centrifugal compressors and/or turbines. In addition, the present invention is equally applicable to aero gas turbine engines, marine gas turbine engines and land-based gas turbine engines.

In the illustrated embodiment, gas turbine engine 10 includes a fan 12, a compressor 14 with outlet guide vane (OGV) 16, a surge margin bleed system 18, an accessory drive system 20, a power recuperation system 22, a diffuser 24, a combustor 26, a high pressure (HP) turbine 28, a low pressure (LP) turbine 30, an exhaust nozzle 32 and a bypass duct 34. Diffuser 24 and combustor 26 are fluidly disposed between OGV 16 of compressor 14 and HP turbine 28. LP turbine 30 is drivingly coupled to fan 12 via an LP shaft 36. HP turbine 28 is drivingly coupled to compressor 14 via an HP shaft 38. Compressor 14, HP shaft 38 and HP turbine 28 form, in part, an HP spool. Fan 12, LP shaft 36 and LP turbine 30 form, in part, an LP spool. In one form, engine 10 is a two-spool engine. In other embodiments, engine 10 may have any number of spools, and may be, for example, a three-spool engine or a single spool engine.

Compressor 14 includes a plurality of blades and vanes 40 for compressing air. During the operation of gas turbine engine 10, air is drawn into the inlet of fan 12 and pressurized by fan 12. Some of the air pressurized by fan 12 is directed into compressor 14 and the balance is directed into bypass duct 34. Bypass duct 34 directs the pressurized air to exhaust nozzle 32, which provides a component of the thrust output by gas turbine engine 10. Compressor 14 receives the pressurized air from fan 12, which is compressed by blades and vanes 40.

The pressurized air discharged from compressor 14 is then directed downstream by OGV 16 to diffuser 24, which diffuses the airflow, reducing its velocity and increasing its static pressure. The diffused airflow is directed into combustor 26. Fuel is mixed with the air in combustor 26, which is then combusted in a combustion liner (not shown). The hot gases exiting combustor 26 are directed into HP turbine 28, which extracts energy from the hot gases in the form of mechanical shaft power to drive compressor 14 via HP shaft 38. The hot gases exiting HP turbine 28 are directed into LP turbine 30, which extracts energy in the form of mechanical shaft power to drive fan 12 via LP shaft 36. The hot gases exiting LP turbine 30 are directed into nozzle 32, and provide a component of the thrust output by gas turbine engine 10.

Surge margin bleed system 18 is in fluid communication with compressor 14, and is operative to bleed interstage air from compressor 14 to control surge and increase surge margin at some gas turbine engine 10 operating points, e.g., during part power operation, such as in aircraft cruise conditions. In one form, surge margin bleed system 18 bleeds air from compressor 14 from one compressor stage. In other embodiments, gas turbine engine 10 bleeds air from compressor 14 at a plurality of compressor stages simultaneously. In yet other embodiments, surge margin bleed system 18 selectively bleeds air from one or more of a plurality of compressor stages. In one form, surge margin bleed system 18 includes one or more valves (not shown) configured to control surge margin bleed air flow. In various embodiments, the one or more valves may regulate the surge margin bleed flow to one or more desired flow rates, or may simply operate between a minimum flow position (which may yield a zero or non-zero flow area) and a maximum flow position, wherein the surge margin bleed air flow rate is governed by an effective flow area. In other embodiments, other means may be employed to control surge margin bleed flow. In still other embodiments, surge margin bleed flow may be continuous and not controlled by a valve system.

Power recuperation system 22 is in fluid communication with surge margin bleed system 18. Power recuperation system 22 is operative to recapture energy from the air bled from compressor 14 for surge margin control that would otherwise be lost, e.g., by dumping the bleed air overboard.

Figure 2:
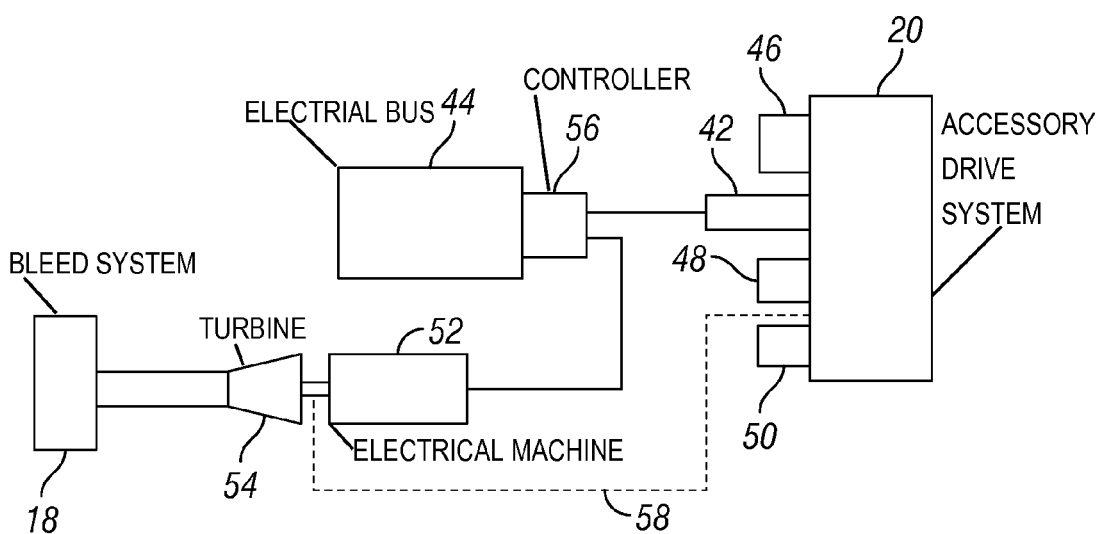
FIG. 2 schematically illustrates a surge margin bleed power recuperation system in accordance with an embodiment of the present invention.

Referring now to FIG. 2, gas turbine engine 10 includes an electrical rotor machine 42, and a system electrical bus 44. Electrical rotor machine 42 is mechanically coupled to accessory drive system 20 and electrically coupled to system electrical bus 44. In one form, accessory drive system 20 is an accessory drive gearbox, although other drives system types may be employed in other embodiments. Accessory drive system 20 is operative to drive one or more accessories, such as accessories 46, 48 and 50. The accessories may be engine accessories, such as one or more fuel pump, oil pump, generator, alternator, and/or may be aircraft and/or other accessories. In one form, system electrical bus 44 is the primary electrical bus for gas turbine engine 10. In another form, system electrical bus 44 is an aircraft electrical bus. Electrical rotor machine 42 is configured to convert electrical power into mechanical power. In one form, electrical rotor machine 42 is a generator. In other embodiments, electrical rotor machine 42 may be an alternator or another type of electrical machine configured to convert electrical power into mechanical power. In yet other embodiments, electrical rotor machine 42 may also or alternatively be configured to convert mechanical power into electrical power, and may be, for example and without limitation, a motor/generator a motor/alternator, a generator or an alternator.

In one form, power recuperation system 22 includes an electrical rotor machine 52, an auxiliary turbine, such as an air turbine 54, and a controller 56. Electrical rotor machine 52 is coupled to air turbine 54. In one form, electrical rotor machine 52 is a high speed machine and is coupled to air turbine 54 in a direct drive arrangement. In other embodiments, electrical rotor machine 52 may be coupled to air turbine via one or more step-down and/or step-up gear drive systems or other types of mechanical power transmission systems. In one form, controller 56 is electrically coupled to system electrical bus 44. In one form, electrical rotor machine 52 is electrically coupled to controller 56. Power recuperation system 22, in particular air turbine 54, is in fluid communication with surge margin bleed system 18 and operative to receive bleed air from surge margin bleed system 18 that is used to preserve or enhance the surge margin of compressor 14. Power recuperation system 22 is operative to convert power from the surge margin bleed air, that would otherwise be lost, into useful power that may be used by gas turbine engine 10, and/or the aircraft or other system into which gas turbine engine 10 is installed.

Electrical rotor machine 52 is configured to convert mechanical power into electrical power. In one form, electrical rotor machine 52 is a generator. In another form, electrical rotor machine 52 is an alternator. In other embodiments, electrical rotor machine 52 may be another type of electrical machine configured to convert power into mechanical electrical power. In one form controller 56 is a dedicated power control logic unit. In another form, controller 56 is a part of another controller, such as a full authority digital electronic controller (FADEC) for operating gas turbine engine 10, or another engine or aircraft controller. In one form, controller 56 is microprocessor based and the program instructions are in the form of software stored in a memory (not shown). However, it is alternatively contemplated that the controller and program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions.

Air turbine 54 receives the surge margin bleed air from surge margin bleed system 18. Electrical rotor machine 52 is mechanically coupled to air turbine 54, and produces electrical power from the air received by air turbine 54. Absent the present invention, compressor surge margin control of a two-spool gas turbine engine is done via bleed air that is wasted, resulting in a loss of overall engine efficiency. Gas turbine engines typically use an engine rotor, such as the HP spool, for accessory power extraction for an accessory gear box, such as accessory drive system 20. In addition to the lost bleed air, accessories also result in power lost in the overall gas turbine cycle. In one form, the present application uses the surge margin control bleed air flow to generate additional electrical power via driving an air turbine 54 directly coupled to a high-speed electrical rotor machine 52. A power control logic unit, e.g., controller 56, connected to or located on the system electrical bus 44, takes advantage of the extra electrical power generated by the bleed air via electrical rotor machine 52. This may lower the accessory gearbox mounted electrical rotor machine 42 power demand, and may result in additional surge margin capability to be utilized.

Typical gas turbine engines, such as two spool gas turbine engine applications, have a fixed set of operability limits. A given amount of surge margin is normally built into the engine as delivered to the customer. Continued need for additional power extraction demands from the end use customer often consumes the as-delivered baseline surge margin. If additional power extraction demands by the customer are agreed to, and not completely understood, the result may include negative surge margins in certain regions of the engine operability envelope. Power recuperation system 22 may, in one form, provide a potential means for gaining back additional surge margin. Assuming the additional weight of the power recuperation system 22 is outweighed by its own power production capacity, the system may in one form provide a means to answer increasing customer power extraction needs. Additionally, the system may offer additional solutions. Such as, but not limited to; allowing for varying the engine cycle to get more power out of certain operating regimes the customer desires, a means of offering the customer an off-the-shelf solution for augmenting capability of a given legacy engine(s), more flexibility in the preliminary design phase of a new engine program. These may also applicable to ground based and marine applications. Ground based and marine applications using a power recuperation system may give greater gains in system performance than flight systems—weight is normally not an issue—likely allowing for optimization, e.g., of the air turbine, generator, electrical bus, and power control logic unit.

Many embodiments of the present invention are envisioned. In one form, electrical rotor machine 42 is an accessory in the form of a generator, and electrical rotor machine 52 is a high speed generator directly driven by air turbine 54. Bleed air pressure received into power recuperation system 22 is converted by air turbine 54 into shaft power, which is converted by electrical rotor machine 52 into electrical power. The electrical power is conditioned, and is supplied to system electrical bus 44 via controller 56, thereby reducing the electrical load demand on electrical rotor machine 42 and mechanical load demand on accessory drive system 20.

In another form, electrical rotor machine 42 is a motor (e.g., or a motor/generator) and electrical rotor machine 52 is a high speed generator directly driven by air turbine 54. Bleed air pressure received into power recuperation system 22 is converted by air turbine 54 into shaft power, which is converted by electrical rotor machine 52 into electrical power. The electrical power is conditioned, and is supplied to electrical rotor machine 42 via controller 56, which in turn supplies mechanical power to accessory drive system 20.

In still another form, air turbine 54 may be mechanically coupled to accessory drive system 20 for delivering the shaft power to accessory drive system 20 without employing electrical rotor machine 52, e.g., as indicated by dashed line 58 in FIG. 2, for example, to drive or help drive accessories 46, 48 and 50.

Embodiments of the present invention include a gas turbine engine. The gas turbine engine includes a compressor; a combustor in fluid communication with the compressor; a turbine in fluid communication with the combustor; a surge margin bleed system in fluid communication with the compressor and operative to bleed air from the compressor to control surge margin; and a power recuperation system in fluid communication with the surge margin bleed system and operative to recapture power from the surge margin bleed air.

In one refinement, the power recuperation system includes an auxiliary turbine in fluid communication with the surge margin bleed system, wherein the auxiliary turbine is operative to receive bleed air from the surge margin bleed system and to extract the power from the surge margin bleed air. In another refinement, the gas turbine engine further includes an accessory drive system, wherein the auxiliary turbine is mechanically coupled to the auxiliary drive system and operative to transmit the power from the surge margin bleed air to the accessory drive system in the form of shaft power.

In yet another refinement, the power recuperation system further includes a first generator mechanically coupled to the auxiliary turbine.

In still another refinement, the gas turbine includes an accessory drive system operative to drive an accessory, wherein the power recuperation system further includes an electric motor mechanically coupled to the accessory drive system and electrically coupled to the first generator, and wherein the electric motor is operative to receive power from the first generator and to provide mechanical power to the accessory drive system based on the received power.

In yet still another refinement, the gas turbine engine includes a system electrical bus, wherein the first generator is electrically coupled to the system electrical bus and operative to provide power recaptured from the surge margin bleed air to the system electrical bus.

In a further refinement, the gas turbine engine further includes a controller communicatively coupled to the first generator and to the system electrical bus, and wherein the controller is configured to execute program instructions to control the power provided from the first generator to the system electrical bus.

In a yet further refinement, the gas turbine engine further includes an accessory drive system and a second generator powered by the accessory drive system and electrically coupled to the system electrical bus, wherein both the first generator and the second generator are operative to provide power to the system electrical bus.

In still a further refinement, the gas turbine engine further includes a controller coupled to the first generator, the second generator and to the system electrical bus, wherein the controller is configured to execute program instructions to control the power provided from the first generator and the second generator to the system electrical bus.

Embodiments of the present invention include a gas turbine engine, comprising: a compressor configured to discharge surge margin bleed air to control surge margin; a combustor in fluid communication with the compressor; a turbine in fluid communication with the combustor; an auxiliary turbine in fluid communication with the compressor and operative to recapture power from the surge margin bleed air; and an electrical rotor machine coupled to the auxiliary turbine and operative to convert mechanical power generated by the auxiliary turbine to electrical power.

In a refinement, an electrical bus is coupled to the electrical rotor machine and operative to receive the electrical power from the electrical rotor machine.

In another refinement, the electrical bus is an engine electrical bus.

In yet another refinement, the electrical bus is an aircraft electrical bus for an aircraft into which the gas turbine engine is installed.

In still another refinement, the electrical rotor machine is a first electrical rotor machine, further comprising a second electrical rotor machine electrically coupled to the first electrical rotor machine, wherein the second electrical rotor machine is operative to convert the electrical power from the first electrical rotor machine into mechanical power.

In yet still another refinement, the gas turbine engine further comprises an accessory drive system coupled to the second electrical rotor machine, wherein the second electrical rotor machine is operative to supply the mechanical power to the accessory drive system.

In a further refinement, the electrical rotor machine is a first electrical rotor machine, further comprising a second electrical rotor machine electrically coupled to the first electrical rotor machine, wherein the second electrical rotor machine is operative to convert the mechanical power received from the gas turbine engine into electrical power; and wherein the electrical power from the first electrical rotor machine is operative to reduce an electrical load on the second electrical rotor machine.

In a yet further refinement, the gas turbine engine further comprises an engine-driven accessory drive system coupled to the second electrical rotor machine, wherein the second electrical rotor machine is powered by the accessory drive system.

Embodiments include a gas turbine engine, comprising: a compressor configured to discharge surge margin bleed air to control surge margin; a combustor in fluid communication with the compressor; a turbine in fluid communication with the combustor; and means for recapturing power from the surge margin bleed air.

In a refinement, the means for recapturing includes an auxiliary turbine in fluid communication with the compressor and operative to recapture power from the surge margin bleed air.

In another refinement, the gas turbine engine further comprises an accessory drive system powered at least in part by the auxiliary turbine.

In yet another refinement, the gas turbine engine further comprises an electrical rotor machine coupled in a direct-drive arrangement to the auxiliary turbine and configured to convert the recaptured power to electrical power.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
a compressor;
a combustor in fluid communication with said compressor;
a turbine in fluid communication with said combustor;
a surge margin bleed system in fluid communication with said compressor and operative to bleed air from said compressor as surge margin bleed air to control surge margin;
a power recuperation system in fluid communication with said surge margin bleed system and operative to recapture power from the surge margin bleed air; and
an accessory drive system;
wherein said power recuperation system includes an auxiliary turbine in the form of an air turbine in direct fluid communication with the surge margin bleed system such that the surge margin bleed system provides a continuous surge margin bleed flow not controlled by a valve system to the air turbine; and
wherein said power recuperation system further includes a first generator mechanically coupled to said auxiliary turbine;
a system electrical bus, wherein said first generator is electrically coupled to said system electrical bus and operative to provide power recaptured from the surge margin bleed air to said system electrical bus; and
a controller communicatively coupled to said first generator and to said system electrical bus, and wherein said controller is configured to execute program instructions to control the electrical power provided from said first generator to said system electrical bus.

2. The gas turbine engine of claim 1, wherein said auxiliary turbine is operative to receive the bleed air from said surge margin bleed system and to extract power from the surge margin bleed air.

3. The gas turbine engine of claim 2, wherein said auxiliary turbine is operative to transmit the power from the surge margin bleed air to the accessory drive system in the form of shaft power.

4. The gas turbine engine of claim 1, wherein the accessory drive system is operative to drive an accessory, wherein said power recuperation system further includes an electric motor mechanically coupled to said accessory drive system and electrically coupled to said first generator, and wherein said electric motor is operative to receive electrical power from said first generator and to provide mechanical power to said accessory drive system based on the received electrical power.

5. The gas turbine engine of claim 1, further comprising a second generator powered by said accessory drive system and electrically coupled to said system electrical bus, wherein both said first generator and said second generator are operative to provide power to said system electrical bus.

6. A gas turbine engine, comprising:
a compressor configured to discharge surge margin bleed air to control surge margin;
a combustor in fluid communication with said compressor;
a turbine in fluid communication with said combustor;
an accessory drive system mechanically connected to a first spool driven by the gas turbine;
an auxiliary turbine in the form of an air turbine in direct fluid communication with said compressor and operative to recapture power from the surge margin bleed air as discharged by the compressor;
a first electrical rotor machine coupled to the auxiliary turbine by a second spool driven by the air turbine and operative to convert mechanical power generated by the auxiliary turbine to extra electrical power; and
a second electrical rotor machine electrically coupled to the first electrical rotor machine and operative to supply mechanical power to the accessory drive system and/or receive mechanical power from the accessory drive system;
wherein the second electrical rotor machine is operative to convert the extra electrical power from the first electrical rotor machine into mechanical power to supply to the accessory drive system;
wherein an electrical bus is coupled to the first electrical rotor machine and operative to receive the extra electrical power from the first electrical rotor machine;
a controller communicatively coupled to said first electrical rotor machine and to said system electrical bus, and wherein said controller is configured to execute program instructions to controllably utilize the extra electrical power provided from said first electrical rotor machine to power said second electrical rotor machine via said system electrical bus to controllably lower an electrical power demand of said second electrical rotor machine in supplying mechanical power to the accessory drive system.

7. The gas turbine engine of claim 6, wherein the electrical bus is an engine electrical bus.

8. The gas turbine engine of claim 6, wherein the electrical bus is an aircraft electrical bus for an aircraft into which the gas turbine engine is installed.

9. The gas turbine engine of claim 6, wherein the accessory drive system is coupled to the second electrical rotor machine.

10. The gas turbine engine of claim 6, wherein the second electrical rotor machine is operative to convert the mechanical power received from the accessory drive system into second electrical rotor machine electrical power; and wherein the extra electrical power from the first electrical rotor machine is operative to reduce an electrical load on the second electrical rotor machine.

11. The gas turbine engine of claim 10, further comprising an engine-driven accessory drive system coupled to the second electrical rotor machine, wherein the second electrical rotor machine is powered by the engine-driven accessory drive system.

* * * * *